US008738927B2

(12) United States Patent
Hubert

(10) Patent No.: US 8,738,927 B2
(45) Date of Patent: May 27, 2014

(54) ARRANGEMENT FOR AND METHOD OF PROTECTING A DATA PROCESSING DEVICE AGAINST AN ATTACK OR ANALYSIS

(75) Inventor: Gerardus Tarcisius Maria Hubert, Geldrop (NL)

(73) Assignee: Irdeto B.V., Hoofddorp (NL)

( * ) Notice: Subject to any disclaimer, the term of this patent is extended or adjusted under 35 U.S.C. 154(b) by 1009 days.

(21) Appl. No.: 11/993,265

(22) PCT Filed: Jun. 23, 2006

(86) PCT No.: PCT/IB2006/052055
§ 371 (c)(1),
(2), (4) Date: Dec. 20, 2007

(87) PCT Pub. No.: WO2007/000702
PCT Pub. Date: Jan. 4, 2007

(65) Prior Publication Data
US 2010/0100748 A1    Apr. 22, 2010

(30) Foreign Application Priority Data

Jun. 29, 2005 (EP) .................................... 05105806

(51) Int. Cl.
*G06F 11/30* (2006.01)
*G06F 12/14* (2006.01)
(52) U.S. Cl.
USPC ............................................ 713/189; 726/30
(58) Field of Classification Search
USPC ..................... 713/189, 174; 380/28
See application file for complete search history.

(56) References Cited

U.S. PATENT DOCUMENTS

| 4,405,829 A | 9/1983 | Rivest |
| 6,876,745 B1 | 4/2005 | Kurumatani |

(Continued)

FOREIGN PATENT DOCUMENTS

| CN | 1415106 A | 4/2003 |
| EP | 1014617 A2 | 6/2000 |

(Continued)

OTHER PUBLICATIONS

Michael Brownfield, Wireless Sensor Network Denial of Sleep Attack, Jun. 2005, IEEE, pp. 1-8.*

(Continued)

*Primary Examiner* — Mohammad W Reza
*Assistant Examiner* — Monjour Rahim
(74) *Attorney, Agent, or Firm* — Marc S. Kaufman; Reed Smith LLP

(57) ABSTRACT

In order to further develop an arrangement for as well as a method of protecting at least one data processing device, in particular at least one embedded system, for example at least one chip card or smart card, against at least one attack, in particular against at least one side-channel attack, for example against at least one current trace analysis, the data processing device, in particular at least one integrated circuit of the data processing device, carrying out calculations, in particular cryptographic operations wherein an attack, for example an E[lectro]M[agnetic] radiation attack, or an analysis, for example a D[ifferential]P[ower]A[nalysis], such attack or such analysis in particular targeted on finding out a private key, is to be securely averted, it is proposed to blind all intermediate results of the calculations by at least one random variable, without inverting any operand of the calculations.

14 Claims, 4 Drawing Sheets

(56) References Cited

U.S. PATENT DOCUMENTS

Figure 1:
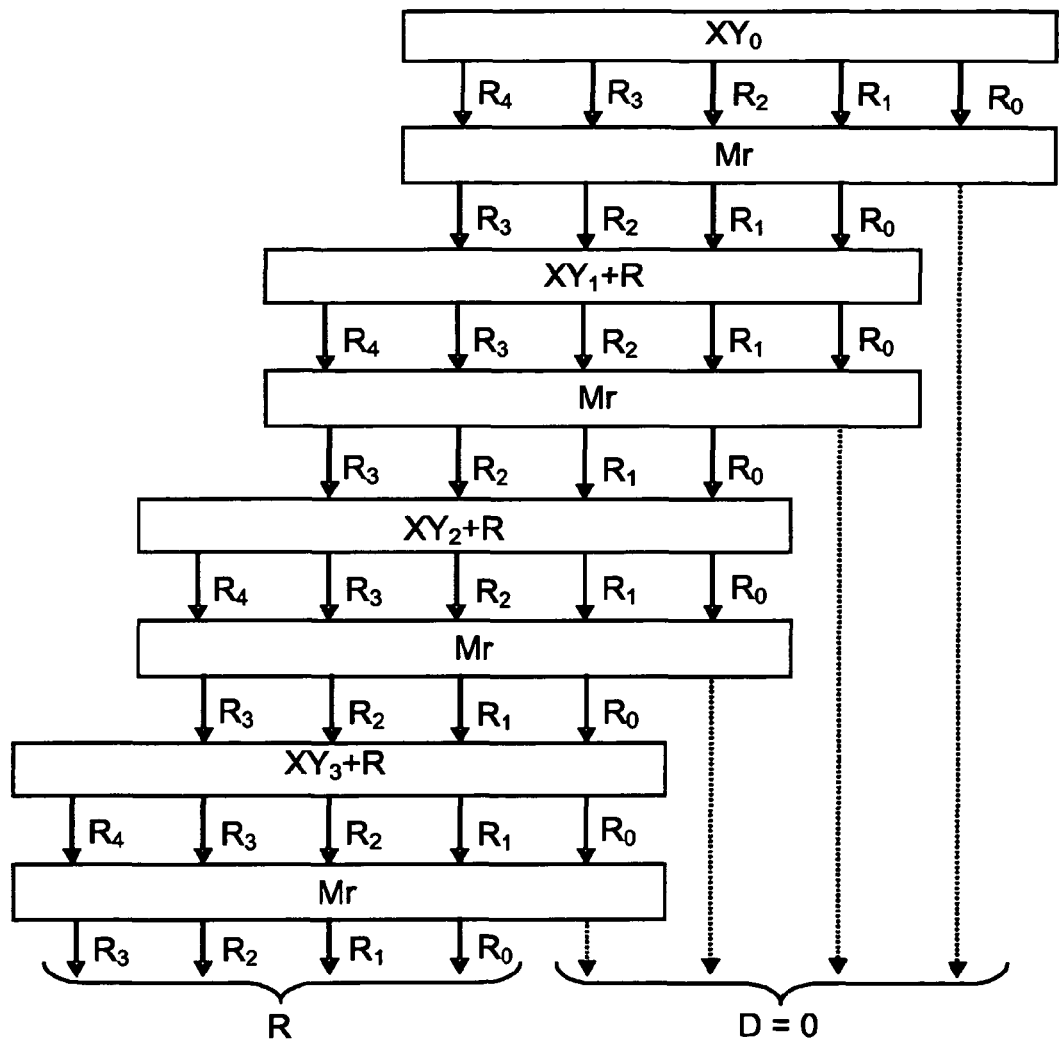

| | | | |
|---|---|---|---|
| 7,058,808 | B1 | 6/2006 | Zolotorev et al. |
| 7,286,666 | B1 | 10/2007 | Coron |
| 7,386,130 | B2 | 6/2008 | Ito et al. |
| 7,403,620 | B2 | 7/2008 | Liardet et al. |
| 7,441,125 | B2 | 10/2008 | Drexler et al. |
| 2003/0033340 | A1 | 2/2003 | Asami |
| 2003/0044014 | A1 | 3/2003 | Liardet et al. |
| 2003/0079139 | A1 | 4/2003 | Drexler et al. |
| 2003/0194086 | A1 | 10/2003 | Lambert |
| 2004/0252830 | A1 | 12/2004 | Chen et al. |
| 2005/0063548 | A1 | 3/2005 | Antipa |
| 2005/0066174 | A1* | 3/2005 | Perlman ............... 713/176 |
| 2005/0084098 | A1 | 4/2005 | Brickell |
| 2006/0045262 | A1* | 3/2006 | Orlando ............... 380/28 |
| 2006/0069710 | A1* | 3/2006 | Har et al. ............... 708/491 |
| 2006/0126830 | A1* | 6/2006 | Shimizu ............... 380/28 |
| 2007/0177721 | A1 | 8/2007 | Itoh et al. |
| 2010/0287384 | A1 | 11/2010 | Hubert |

FOREIGN PATENT DOCUMENTS

| | | |
|---|---|---|
| EP | 1267514 A2 | 12/2002 |
| EP | 1296224 A1 | 3/2003 |
| EP | 1379023 A1 | 1/2004 |
| EP | 1648111 A1 | 4/2006 |
| FR | 2810178 A1 | 12/2001 |
| GB | 2345229 A1 | 6/2000 |
| JP | 2000-187438 A | 7/2000 |
| JP | 2002-540484 A | 11/2002 |
| JP | 2002-366029 A | 12/2002 |
| JP | 2003-98962 A | 4/2003 |
| JP | 2003-177668 A | 6/2003 |
| JP | 2003-525538 A | 8/2003 |
| JP | 2004-354920 A | 12/2004 |
| WO | WO-00/42511 A1 | 7/2000 |
| WO | WO0108012 A1 | 2/2001 |
| WO | WO0131436 A1 | 3/2001 |
| WO | WO0148706 A1 | 7/2001 |
| WO | WO0197009 A1 | 12/2001 |
| WO | WO-02/50658 A1 | 6/2002 |
| WO | WO-03/101039 A1 | 12/2003 |
| WO | WO-2005/008955 A1 | 1/2005 |
| WO | WO-2007/000701 A2 | 1/2007 |
| WO | WO-2007000702 A2 | 1/2007 |

OTHER PUBLICATIONS

Thomas S. Messerges et al., "Securing the AES Finalists Against power Analysis Attacks", Motorola Labs, Motorola, FSE 2000, LNCS 1978, pp. 150-164, Springer-Verlag Berlin, Heidelberg 2001.

Jean-Sebastien Coron et al., On Boolean and Arithmetic Masking Against Differential power Analysis, Gemplus Card Int'l, France.

Radu Muresan, "Modeling and Applications of Current Dynamics in a Complex Processor Core", University of Waterloo, Thesis, Doctorate in Philosophy in Electrical and Computer Engineering, 2003, pp. 33-37.

Luca Benini et al., "Energy-Efficient Data Scrambling on Memory-Processor Interfaces", ISLPED 2003, Seoul, Korea, ACM 1-58113-682.

Larry T. McDaniel III, "An Investigation of Differential Power Analysis Attacks on FPGA-based Encryption Systems", Faculty of the Virginia Polytechnic Institute and Sate University, Thesis, Master of Science in Electrical Engineering, May 2003, Blacksburg, Virginia.

R.L. Rivest et al., "A Method for Obtaining Digital Signatures and Public-Cryptosystems", MIT Laboratory for Computer Science and Dept. of Mathematics, Communications of the ACM, pp. 120-126, Feb. 1978.

Tom Lash et al., "A Study of Power Analysis and the Advanced Encryption Standard", Recommendations for Designing Power Analysis Resistant Devices, MS Scholar paper, George Mason University, Feb. 2002.

M. Ernst et al., "A Reconfigurable System on Chip Implementation for Elliptic Curve Cryptography over GF(2n)", Integrated Circuits and Systems Lab, Computer Science Dept., Darmstadt University of Technology, Germany, CHES 2002, LNCS 2523, pp. 381-399.

"Chinese Application Serial No. 200680023448.9, First Office Action mailed Apr. 10, 2009", (w/ English Translation), 11 pgs.

"International Application Serial No. PCT/IB2006/052053, International Search Report mailed Dec. 19, 2006", 2 pgs.

"International Application Serial No. PCT/IB2006/052053, Written Opinion mailed Dec. 19, 2006", 7 pgs.

"International Application No. PCT/IB2006/052055, PCT Written Opinion", (Jan. 9, 2008), 8 pgs.

"International Application Ser. No. PCT/IB2006/052055, Search Report", (Mar. 29, 2007), 3 pgs.

U.S. Appl. No. 11/993,289, Examiner Interview Summary mailed Aug. 1, 2012, 2 pgs.

European Application Serial No. 09717405.6, Office Action mailed Oct. 13, 2010, 2 pgs.

European Application Serial No. 09717405.6, Response filed Jan. 13, 2012 to Office Action mailed Jul. 5, 2011, 14 pgs.

European Application Serial No. 09717405.6, Response filed Nov. 12, 2010 to Office Action mailed Oct. 13, 2010, 3 pgs.

International Application Serial No. PCT/IB2006/052053, International Preliminary Report on Patentability dated Jan. 9, 2008, 8 pgs.

International Application Serial No. PCT/IB2006/052055, International Preliminary Report on Patentability dated Jan. 9, 2008, 8 pgs.

Chinese Application No. 200680023842.2, Office Action mailed Aug. 4, 2011, 21 pgs.

European Application No. 06765839.3, Summons to Attend Oral Procedings mailed Aug. 5, 2011, 8 pgs.

U.S. Appl. No. 11/993,289, Non Final Office Action mailed Jan. 19, 2012, 23 pgs.

Japanese Application Serial No. 2008-519042, Office Action mailed Dec. 6, 2011, 6 pgs.

Ciet, M., et al., "Parallel FPGA Implementation of RSA with Residue Number Systems—Can side-channel threats bee avoided?—Extended Version", *Cryptology ePrint Archive, International Association for Cryptologic Research, Report 2004/187*, [online]. [retrieved on Nov. 29, 2011]. Retrieved from the Internet: <URL: http://eprint.iacr.org/2004/187>, (Aug. 7, 2004), 17 pgs.

Trichina, E., "Combination Logic Design for AES SubByte Transformation on Masked Data", *Cryptology ePrint Archive, International Association for Cryptologic Research, Report 2003/236*. [online]. [retrieved on Nov. 29, 2011]. Retrieved from the Internet: <URL: http://eprint.iacr.org/2003/236>, (Nov. 12, 2003), 14 pgs.

Japanese Application Serial No. 2008-519042; Office Action mailed Jul. 3, 2012, (English Translation), 4 pgs.

* cited by examiner

ARRANGEMENT FOR AND METHOD OF PROTECTING A DATA PROCESSING DEVICE AGAINST AN ATTACK OR ANALYSIS

The present invention relates in general to the technical field of impeding crypto analysis, in particular of protecting at least one data processing device against at least one attack, for example against at least one E[lectro]M[agnetic] radiation attack, or against at least one analysis, for example against at least one D[ifferential]P[ower]A[nalysis].

More specifically, the present invention relates to an arrangement for and a method of protecting at least one data processing device, in particular at least one embedded system, for example at least one chip card or smart card, against at least one attack, in particular against at least one side-channel attack, for example against at least one current trace analysis, the data processing device, in particular at least one integrated circuit of the data processing device, carrying out calculations, in particular cryptographic operations.

Data processing devices, in particular embedded systems, such as chip cards or smart cards, use P[ublic]K[ey]I[nfrastructure] systems for exchanging keys and have to be protected against several forms of attacks targeted on finding out the private key. One such attack is to influence the calculation, in particular the cryptographic operation, by directing
- one or more light sources on the chip, in particular on the naked (and thus light-sensitive) chip or
- some kind of E[lectro]M[agnetic] radiation source(s) on the chip.

For calculations based on the R[ivest-]S[hamir-]A[dleman] algorithm and/or on the E[lliptic]C[urve]C[ryptography] algorithm, a lot of multiplications are required. Normally, these calculations are performed without protection against side-channel attacks, as for instance current trace analysis.

This might be vulnerable to a D[ifferential]P[ower]A[nalysis] attack because an attacker might take a lot of current traces each time the same multiplication is performed. After adding these traces, most of the noise is removed. When the attacker does the same but for different inputs, the attacker can compare the current traces and learn the secret key bit-wise, i.e. bit for bit.

Prior art document WO 01/97009 A1 discloses a method for cryptographic calculation comprising a modular exponentiation routine. This known method works with two random variables to blind intermediate results; in this context, prior art document WO 01/97009 A1 works also with an addition of a random variable but only the multiplication operation is blinded.

However, before the result is used for the next calculation, this result is first unblinded which makes the result again vulnerable; not only the multiplication is sensitive to D[ifferential]P[ower]A[nalysis] but also the access of the R[andom]A[ccess]M[emory] of the unblinded results.

Prior art article "On Boolean and Arithmetic Masking against Differential Power Analysis" by Jean-Sébastien Coron and Louis Goubin discusses the D[ifferential]P[ower]A[nalysis] attack and suggests in the fourth and fifth paragraph of page 2 to mask all inputs and outputs. The fifth paragraph discusses masking of R[ivest-]S[hamir-]A[dleman] by multiplication, wherein reference is made to Thomas S. Messerges, "Securing the AES Finalists Against Power Analysis Attacks", FSE 2000, Springer-Verlag.

Prior art thesis "Modeling and applications of current dynamics in a complex processor core" by Radu Muresan mentions on pages 33 to 37 the blinding of the point on the elliptic curve before applying E[lliptic]C[urve]C[ryptography].

Regarding the technical background of the present invention, additional reference can be made to
- prior art article "Energy-Efficient Data Scrambling on Memory-Processor Interfaces" by Luca Benini, Angelo Galati, Alberto Macii, Enrico Macli, and Massimo Poncino;
- prior art article "A Study of Power Analysis and the Advanced Encryption Standard-Recommendations for Designing Power Analysis Resistant Devices" by Tom Lash;
- prior art document EP 1 014 617 A2;
- prior art document EP 1 267 514 A9;
- prior art document GB 2 345 229 A;
- prior art document US 2003/0194086 A1;
- prior art document WO 00/42511 A1;
- prior art document WO 01/08012 A1;
- prior art document WO 01/31436 A1;
- prior art document WO 02/50658 A1;
- prior art document WO 03/101039 A1; and
- prior art thesis "An Investigation of Differential Power Analysis Attacks on FPGA-based Encryption Systems" by Larry T. McDaniel III.

Starting from the disadvantages and shortcomings as described above and taking the prior art as discussed into account, an object of the present invention is to further develop an arrangement as described in the technical field as well as a method of the kind as described in the technical field in order to be capable of securely averting an attack, for example an E[lectro]M[agnetic] radiation attack, or an analysis, for example a D[ifferential]P[ower]A[nalysis], such attack or such analysis in particular targeted on finding out a private key.

The object of the present invention is achieved by an arrangement comprising the features of claim 1 as well as by a method comprising the features of claim 8. Advantageous embodiments and expedient improvements of the present invention are disclosed in the respective dependent claims.

The present invention is principally based on the idea to use an arrangement for as well as a method of blinding intermediate results for providing invulnerability, in particular D[ifferential]P[ower]A[nalysis] invulnerability; in particular, such blinding is employed in multiplications, for example by addition, comprised by the calculations, in particular by the cryptographic operations, by employing at least one random variable, wherein the calculation of the inversion of any operand is not required.

More specifically, a message M can be blinded with a variable V. This variable V can be derived from a randomly chosen variable v. In this way, all intermediate results are also blinded; these intermediate results remain blinded until the end of the calculations, in particular until the end of the cryptographic operations.

According to an expedient embodiment of the present invention, all intermediate results are blinded by a random variable which is kept constant during a complete R[ivest-]S[hamir-]A[dleman] calculation or a complete E[lliptic]C[urve]C[ryptography] calculation but which is changed when a new calculation is started. By this, all current traces are changed, even when all inputs are the same because the random variable is not the same.

In a preferred embodiment of the present invention, the principle of Montgomery reduction is used. The Montgomery reduction is an efficient algorithm for multiplication in modular arithmetic introduced in 1985 by Peter L. Montgomery.

More concretely, the Montgomery reduction is a method for computing c=a·b mod(n) where a, b, and n are k-bit binary numbers.

The Montgomery reduction is now applied particularly in cryptography. Let m be a positive integer, and let R and T be integers such that R>m, g[reatest]c[ommon]d[ivisor](m,R)=1, and $0 \leq T < m \cdot R$. To calculate $TR^{-1}$ mod(m) without using classical method is called the Montgomery reduction of T modulo m with respect to R. With suitable choice of R, the Montgomery reduction can be efficiently computed.

Advantageously, the present invention is not restricted to the Montgomery reduction but the present invention can also be adapted to other reduction principles.

The present invention does not require the ability to calculate the inversion of an operand, which might be favourable for R[ivest-]S[hamir-]A[dleman] applications.

The present invention further relates to a data processing device, in particular to an embedded system, for example to a chip card or to a smart card, comprising at least one integrated circuit carrying out calculations, in particular cryptographic operations, wherein the integrated circuit is protected against at least one attack, in particular against at least one E[lectro]M[agnetic] radiation attack, or against at least one crypto-analysis, in particular against at least one D[ifferential]P[ower]A[nalysis]

by blinding all intermediate results of the calculations by at least one random variable, without inverting any operand of the calculations.

The present invention finally relates to the use of at least one arrangement as described above and/or of the method as described above in at least one data processing device as described above to be protected against D[ifferential]P[ower]A[nalysis].

Figure 2:
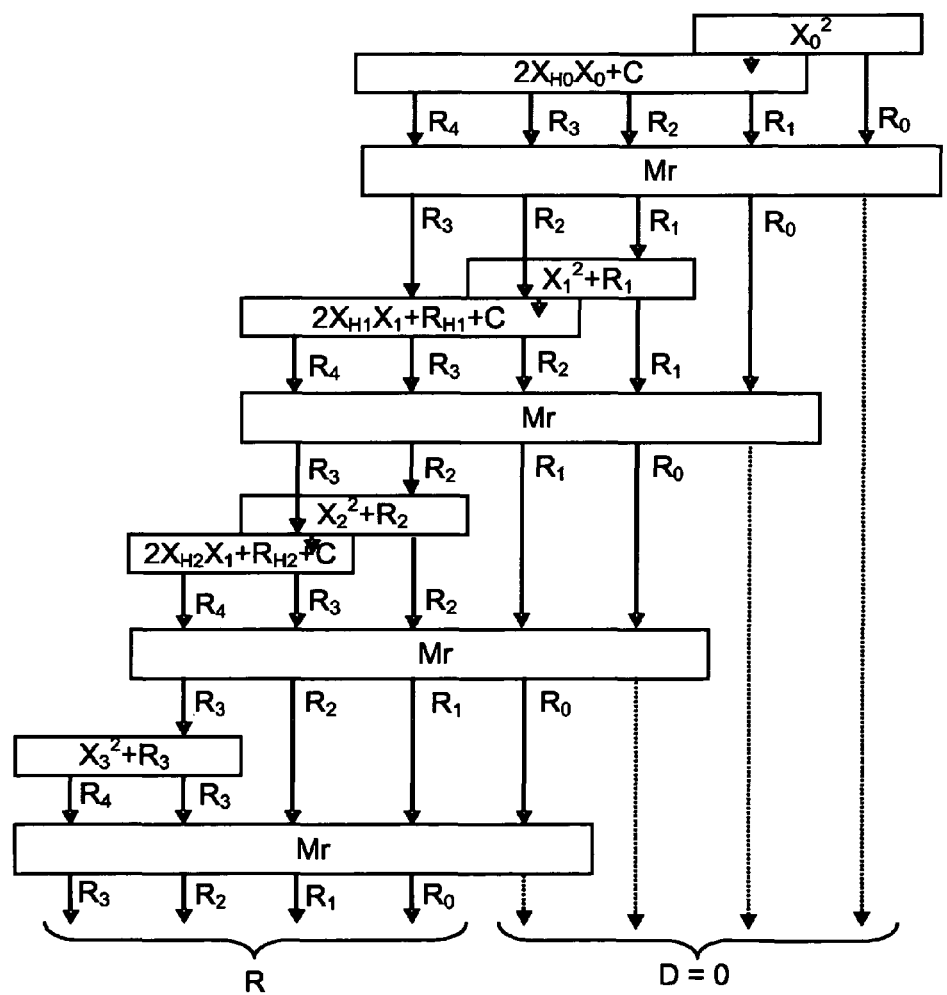
Figure 3:
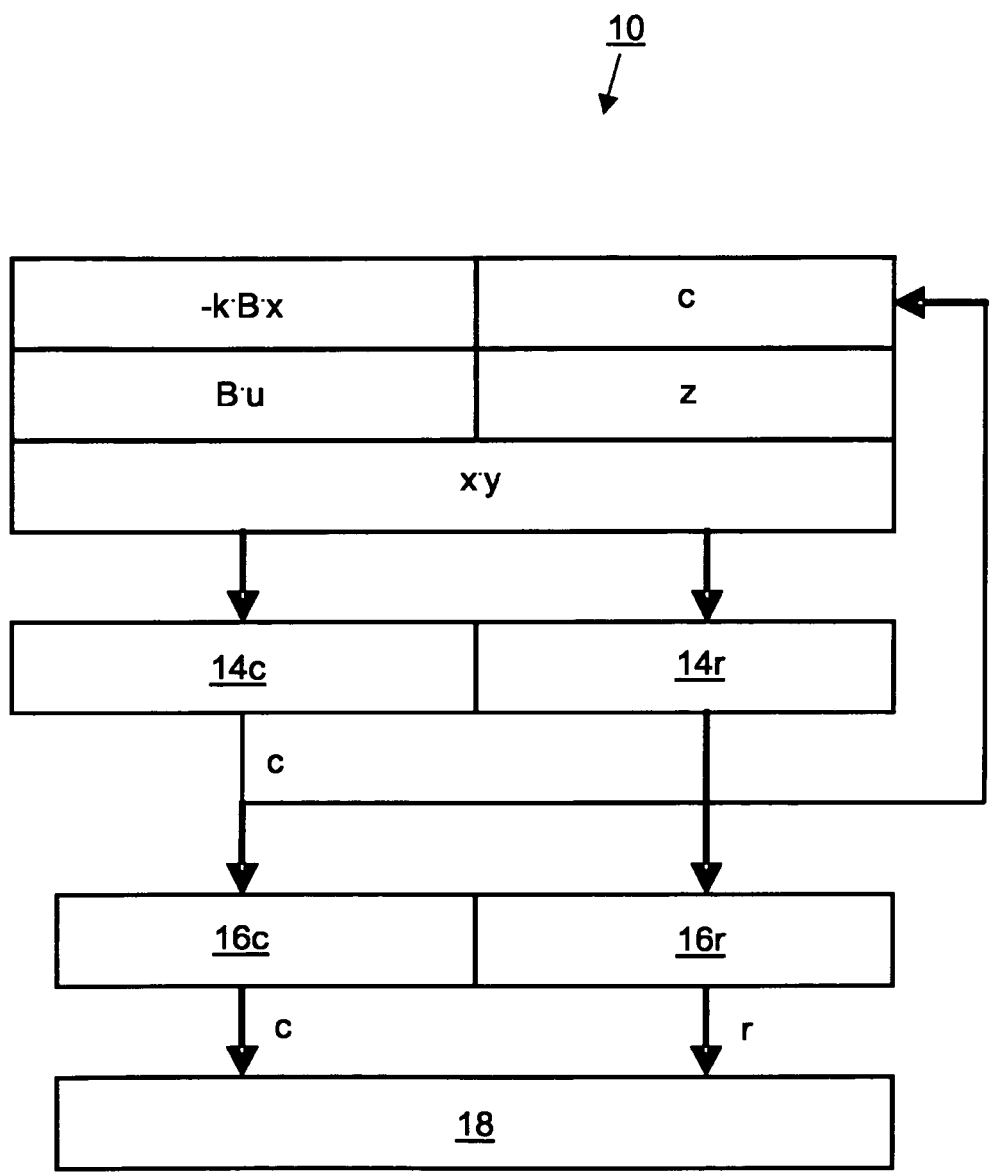
Figure 4:
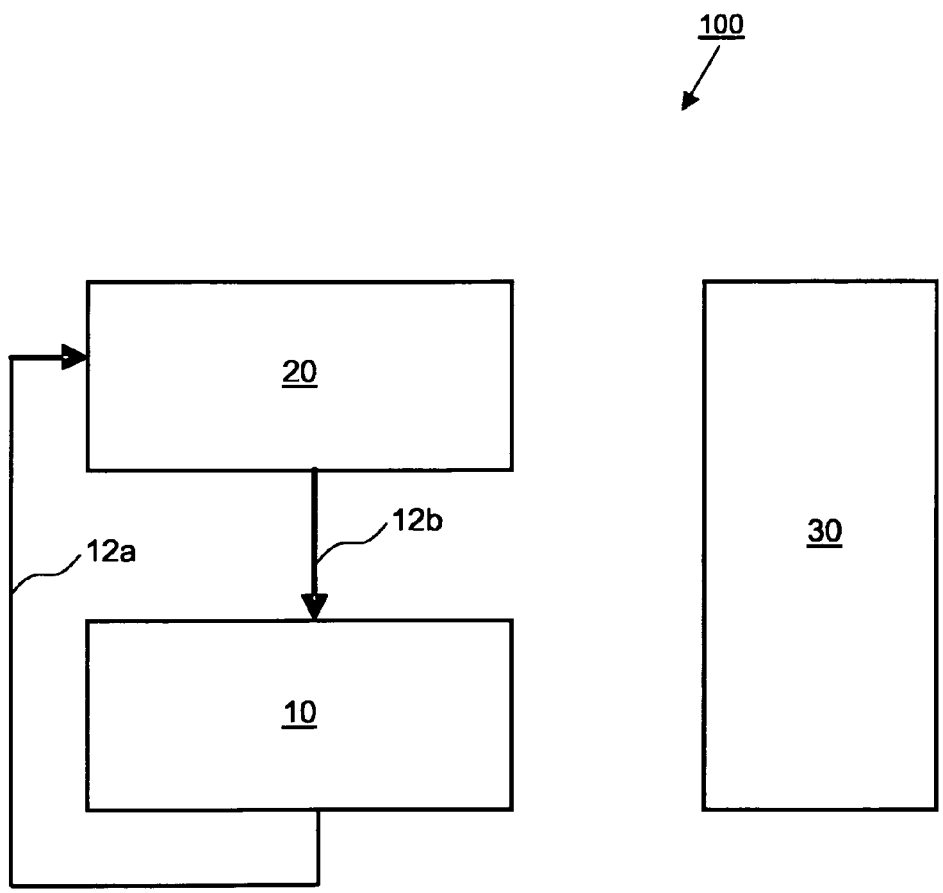

As already discussed above, there are several options to embody as well as to improve the teaching of the present invention in an advantageous manner. To this aim, reference is made to the claims respectively dependent on claim 1 and on claim 8; further improvements, features and advantages of the present invention are explained below in more detail with reference to a preferred embodiment by way of example and to the accompanying drawings where FIG. 1 schematically shows an embodiment of a modular multiplication for four words;

FIG. 2 schematically shows an embodiment of normal R[ivest-]S[hamir-]A[dleman] squaring and of the Montgomery reduction for four words;

FIG. 3 schematically shows an embodiment of a multiplier unit as comprised by the arrangement of FIG. 4; and FIG. 4 schematically shows an embodiment of an arrangement according to the present invention working in compliance with the method of the present invention.

The same reference numerals are used for corresponding parts in FIG. 1 to FIG. 4.

The embodiment of a data processing device, namely an embedded system in the form of a chip card or of a smart card comprising an I[ntegrated]C[ircuit] carrying out cryptographic operations refers to a P[ublic]K[ey]I[nfrastructure] system and works according to the method of the present invention, i. e. is protected by a protection arrangement 100 (cf. FIG. 4) from abuse and/or from manipulation.

The present invention does not require the ability to calculate the inversion of an operand.

The cryptographic calculations of the integrated circuit can be based on the R[ivest-]S[hamir-]A[dleman] algorithm (cf. prior art document U.S. Pat. No. 4,405,829 or prior art article "A Method for Obtaining Digital Signatures and Public-Key Cryptosystems" by Ron Rivest, Adi Shamir, and Len Adleman in Communications of the ACM, 21 (2), pages 120 to 126, February 1978) calculating for encryption $C=M^e$ mod (N) wherein M is the message to be encrypted, N=p·q, e is coprime to (p-1)(q-1), d is such that $x^{ed}$ mod [(p-1)(q-1)]=1;

the decryption calculates $M=C^d$ mod(N).

One of the ways to calculate $M^e$ (or $C^d$) is the following:

first step: starting with R=1;

second step: scanning the exponent e from left to right:

third step: always calculating $R=R^2$ mod(N);

fourth step: when the scanned bit of e=1, moreover R=R.M mod(N) is calculated.

Thus, the calculation comprises a number of squarings and multiplications.

It is assumed that the modulus N comprises a number of words m of n bits, i. e. $N=+n_{m-1}B^{m-1}+n_{m-2}B^{m-2}\ldots+n_1B+n_0$ with $B=2^n$.

After the modular reduction, the variables comprise also of m words of n bits, although the M[ost]S[ignificant]W[ord] might have a few bits more. Before the modular reduction, the result will have more words, usually one.

As will be shown in more detail below, the present invention initially blinds M with a randomly chosen variable v of one word. This randomly chosen variable v is subtracted from every word of M mod(N). With $V=(B^{m-1}+B^{m-2}+\ldots+B+1)v$, $\underline{M}$ can be calculated as $\underline{M}=M-V$ mod(N); in this context, the underlining indicates that the variable is blinded. Then the multiplication and the squarings are modified such that the result R is also blinded in the same way with V; so all intermediate results are also blinded. Then at the very last end, when the exponentiation is ready, the result is unblinded.

In more detail, in the first stage of initial blinding let v be a randomly chosen variable of n bits. An additional condition can be $v < n_{m-1}$ in order to facilitate the reduction but when $n_{m-1}$ has a number of leading zeroes, this might jeopardize the blinding because v would always receive at least the same number of leading zeroes.

Then, the randomly chosen variable v is subtracted from every word of M. If the result is negative, N or 2N is added; however, it is expedient to know beforehand whether the result is negative or not.

For this, first $M_{m-1}-v-1+n_{m-1}$ is calculated:

when the result overflows, M−V is calculated;

when the result is positive but does not overflow, M−V+N is calculated;

when the result is negative, M−V+2N is calculated.

The subtraction of v is done by using its 2's complement, i. e. $-V=-B^m+(B-v-1)B^{m-1}+\ldots+(B-v-1)B+(B-v-1)+1$. So all positive numbers except for $B^m$ are added. The term $-B^m$ is not used but when the addition of $(B-v-1)B^{m-1}+\ldots+(B-v-1)B+(B-v-1)+1$ to another variable gives a carry bit, the term $-B^m$ is annihilated.

The mathematical implementation of the above-described calculations is as follows:

```
c = 1
if M_{m-1}-v-1+n_{m-1} ≥ B
        for j = 0 to m-1: B·c+R_j = M_j+(B-v-1)+c
else if M_{m-1}-v-1+n_{m-1} ≥ 0
        for j = 0 to m-1: B·c+R_j = M_j+(B-v-1)+c+n_j
else    or for j = 0 to m-1: B·c+R_j = M_j+(B-v-1)+c+2n_j
```

In the fourth step of R[ivest-]S[hamir-]A[dleman] calculation without protection, i. e. of multiplication, the following calculations are performed:

$$R = X*Y \bmod(N)$$

$$X = x_{m-1}B^{m-1} + x_{m-2}B^{m-2} + \ldots + x_1B + x_0$$

$$Y = y_{m-1}B^{m-1} + y_{m-2}B^{m-2} + \ldots + y_1B + y_0$$

$$B = 2^n,$$

wherein m is the number of words, for instance m=16, and n is the number of bits of a word, for instance n=64.

FIG. 1 gives an example of such modular multiplication of X*Y for four words, i. e. for m=4. Each time one word of Y is multiplied by the complete X, and the previous result R is added. Then, the result is reduced, in the example of FIG. 1 by a Montgomery reduction (=reference numeral Mr in FIG. 1). Then, the procedure is repeated with the next word of Y, until all words of Y have been used.

In a substep of the multiplication, $X \cdot Y_j + R$ is calculated, and then a Montgomery reduction Mr is performed. This is done as follows:

$$C = 0;$$

for $i = 0$ to $m-1$: $\{(B \cdot C + R_i) = X_i Y_j + R_i + C\}$ $$R_m = C.$$

In the case of protection, it is assumed that all operands are blinded with V, i. e. $V = (B^{m-1} + \ldots + B + 1)v$ Then, $\underline{X} = X - V \bmod(N)$, $\underline{Y} = Y - V \bmod(N)$, and $\underline{R} = R - V \bmod(N)$ are calculated.

First, $\underline{Y}_j$ is unblinded:

v is added to every word $\underline{Y}_j$; when it gives a carry, it is added to the next higher word $\underline{Y}_{j+1}$:

$$B \cdot c + \underline{Y}_j = \underline{Y}_j + v + c.$$

Now, $R' = X \cdot Y_j + R + V \cdot Y_j - B^m \cdot v = (X-V)Y_j + R - V + V \cdot Y_j - B^m \cdot v = X \cdot \underline{Y}_j + \underline{R} - V - B^m \cdot v = R' - V$ is calculated. The term $-B^m \cdot v$ is to blind the M[ost]S[ignificant]W[ord] (index m) of the product $X \cdot Y_j$. So the new result $R'$ is also blinded by V. Therefore, $V \cdot Y_j - B^m \cdot v$ has to be added to the multiplication $X \cdot Y_j + R$; it can be written $v \cdot Y_j = BW_H + W_L$.

This results in the following algorithm:

$$C = 0;$$

$$B \cdot c + \underline{Y}_j = \underline{Y}_j + v + c;$$

$$B \cdot W_H + W_L = v \cdot \underline{Y}_j;$$

for $i = 0$ to $m-1$: $\{(B \cdot C + \underline{R}_i) = \underline{X}_i \underline{Y}_j + B \cdot W_H + W_L + \underline{R}_i + C\}$ $$\underline{R}_m = C - v.$$

For j=0, $R = X \cdot Y$ has to be calculated without the addition of R which performed a part of the blinding; in that case, $X \cdot Y_0 - V$ is calculated instead:

$$C = 0;$$

$$B \cdot c + \underline{Y}_0 = \underline{Y}_0 + v + c;$$

$$B \cdot W_H + W_L = v \cdot Y_0;$$

for $i = 0$ to $m-1$: $\{(B \cdot C + \underline{R}_i) = \underline{X}_i Y_0 + B \cdot W_H + W_L - v + C\}$ $$\underline{R}_m = C - v.$$

As to the substep of additional reduction, the Montgomery reduction Mr reduces by one word which might be insufficient. During the multiplication, $R' = X \cdot Y_j + R + V \cdot Y_j - B^m \cdot v$ is calculated. In this context, it should be noted that for $\underline{Y}_j = B-1$, it is $V \cdot Y_j - B^m \cdot v = -v$. With $0 \leq \underline{X} < B^m$, $0 \leq \underline{Y}j < B$, $0 \leq \underline{R} < B^m$, $0 \leq v < B$, it follows that $-B^{m+1} < \underline{R}' < B^{m+1}$. The intermediate result might be negative.

The total result of the multiplication and reduction is $R'' = (N \cdot Q + X \cdot Y_j + R + V \cdot Y_j - B^m \cdot v)/B$. When it is assumed that $\underline{Y}_j$ has its maximum value B-1, then $(V \cdot Y_j - B^m \cdot v)/B = -v/B > -1$, so those terms can be ignored.

In that case, it can be proven that when $\underline{R} < N + \underline{X}$, then also $\underline{R}'' < N + \underline{X}$. So $\underline{R}$ and therefore $\underline{R}''$ is at most one bit larger but it does not accumulate during a number of calculations. Only at the very last end, i. e. when $Y_{m-1}$ is used, then an additional reduction by subtracting N at most twice might have to be performed.

At the other end, when Q=0 and $\underline{Y}_{j-1}=0$, it can be proven that when $\underline{R} > -v \cdot B^{m-1}$, then also $\underline{R}'' > -v \cdot B^{m-1}$; so $\underline{R}''$ might become negative but it will not accumulate during a number of additional reductions; so the result is left negative. Only, at the very last end, i. e. when $Y_{m-1}$ is used, then an additional reduction by adding N at most twice might have to be performed.

The above-described calculations additionally imply that

- each time when the next $\underline{Y}_j$ is loaded first v has to be added and then $v \cdot \underline{Y}_j = B \cdot W_H + W_L$ has to be calculated before, and $W_H$ as well as $W_L$ have to be stored; this is an additional multiplication by which the calculation time might be enlarged;
- $B \cdot W_H + W_L$ has to be added during the multiplication implying additional adder inputs to the multiplier 10 (cf. FIGS. 3 and 4); and
- during the last multiplication of the reduction, v has to be subtracted from the upper part of that result requiring also an adaptation of the multiplier 10 (cf. FIGS. 3 and 4).

In the third step of R[ivest-]S[hamir-]A[dleman] calculations without protection, i. e. of squaring, FIG. 2 depicts the first substep of normal RSA squaring and the Montgomery reduction (=reference numeral Mr in FIG. 2) for four words, i. e. m=4.

It is $X_{Hj} = B^{3 1} {}^1X_{m-1} + \ldots + B^{j+1}X_{j+1}$, i.e. all terms of X starting with $X_{j+1}$;

$R_{Hj} = B^{m-1}R_{m-1} + \ldots + B^{j+1}R_{j+1}$ i. e. all terms of R starting with $R_{j+1}$;

however, $R_{H0} = 0$.

In general, it is calculated $X_j^2 + R_j$ and $2X_{Hj} \cdot X_j + R_{Hj} + C$; then, a Montgomery reduction (=reference numeral Mr in FIG. 2) is performed.

In the third step of R[ivest-]S[hamir-]A[dleman] calculations without protection, i. e. of squaring, it is assumed that all operands are blinded with V, i. e. $V = (B^{m-1} + \ldots + B + 1)v$.

After calculating $\underline{X} = X - V \bmod(N)$ and $\underline{R} = R - V \bmod(N)$, first $\underline{X}_j$ is unblinded; $\overline{v}$ is added to every word $\underline{X}_j$; when it gives a carry, it is added to the next higher word $\underline{X}_{j+1}$: $B \cdot c + \underline{X}_j = \underline{X}_j + v + c$.

Now, for the squaring, the following is calculated:

$$B \cdot C + \underline{R}_j' = \underline{X}_j \cdot X_j + \underline{R}_j + v \cdot X_j = (X_j - v) \cdot X_j + \underline{R}_j + v \cdot X_j = X_j^2 + \underline{R}_j.$$

The addition of the blinded $\underline{R}_j$ blinds the term $\underline{R}_j'$ again.

For the double products, $$\underline{R}_{Hj}' = 2\underline{X}_{Hj} \cdot X_j + \underline{R}_{Hj} + C + 2V_{Hj} \cdot X_j - B^m \cdot v = 2X_{Hj} \cdot X_j + \underline{R}_{Hj} + C - B^m \cdot v,$$

wherein $V_{Hj} = (B^{m-1} + \ldots + B^{j+1})v$:

The term $\underline{R}_{Hj}$ blinds all terms with index ranging from j+1 to m−1;

the term $-B^m \cdot v$ blinds the M[ost]S[ignificant]W[ord] of the result ($R_m$);

all terms R with index ranging from 0 to j−1 are unchanged and therefore blinded.

So, the new result R' is also blinded by V.

Therefore, $v \cdot X_j$ has to be added to the squaring, and $2V_{Hj} \cdot X_j - B^m \cdot v$ has to be added to the double products.

For j=0, $R=X^2$ has to be calculated without the addition of R which performed a part of the blinding; in that case, $X \cdot X_0 - V$ is calculated instead.

This gives the following algorithm:

```
// j = 0
B·c + X₀ = X₀ + v;
B·W_H + W_L = v·X₀;
B·C + R₀ = X₀·X₀ + B·W_H + W_L − v
for i = 1 to m−1: {B·C + R_i = 2X₀·X₀ + B·2W_H + 2W_L − v + C}
R_m = C − v;
R = Montgomery(R);
// j > 0
for j = 1 to m−1:
{        B·c + X_j = X_j + v + c;
         B·W_H + W_L = v·X_j;
         B·C + R_j = X_j·X_j + B·W_H + W_L + R_j;
         for i = j+1 to m−1: {B·C + R_i = 2X_i·X_j + B·2W_H + 2W_L + R_i + C}
         R_m = C − v;
         R = Montgomery(R);
}
```

In the substep of additional reduction, the Montgomery reduction (=reference numeral Mr in FIG. 2) reduces by one word which might be insufficient.

During the multiplication, it is calculated:

$$\underline{R} = (\underline{X}_j \cdot X_j + \underline{R}_j + v \cdot X_j) B^j + 2\underline{X}_{Hj} \cdot X_j + \underline{R}_{Hj} + 2 V_{Hj} \cdot X_j - B^m \cdot v \text{ with}$$

$$R < 2 \underline{X}_{Hj-1} \cdot X_j + \underline{R}_{Hj-1} + 2 V_{Hj-1} \cdot X_j - B^m \cdot v.$$

With $X_j < B$, $X_{Hj-1} < B^m - B^j$; $V_{Hj-1} < B^m - B^j$; v<B, it follows that $R' < 3B^{m+1}$. With all variables being zero, except for v, then $\overline{R'} > -B^{m+1}$. The intermediate result might be negative or when positive overflow by two bits.

The total result of the multiplication and reduction is $$\underline{R}'' < (N \cdot Q + 2\underline{X}_{Hj-1} \cdot X_j + \underline{R}_{Hj-1} + 2 V_{Hj-1} \cdot X_j - B^m v)/B.$$

It can be proven that when $R<N+2X_{Hj-1}+2V_{Hj-1}-B^m$, then also $R''<N+2X_{Hj-1}+2V_{Hj-1}-\overline{B^m}<3B^m+N<4B^m$.

So R and therefore $\overline{R}''$ is at most two bit larger but it does not accumulate during a number of calculations. So, it can be left for all reductions, except for the last one.

The last reduction, however, ends with only a squaring and no double products. This gives the same result as multiplication (see above substep of additional reduction during multiplication without protection).

The above-described calculations additionally imply that also $2(B \cdot W_H + W_L)$ has to be added, beside $B \cdot W_H + W_L$, during the multiplication; this implies that the additional adder for $B \cdot W_H + W_L$ has a multiplexer at the input for shifting the input.

For E[lliptic]C[urve]C[ryptography] (cf. prior art article "A Reconfigurable System on Chip Implementation for Elliptic Curve Cryptography over GF(2n)" by M. Ernst, M. Jung, F. Madlener, et al., pages 381 to 399), an elliptic curve and a point P on that curve are chosen.

At a first instance A, a random number a is chosen; a·P is calculated and sent as public key to a second instance B. At this second instance B, also a random number b is chosen; b·P is calculated and sent as public key to the first instance A.

Then the first instance A calculates K=a·(b·P) and the second instance B calculates K'=b·(a·P). Now K=K' and this is the common secret of the two instances A and B.

The basic operation is the multiplication of a point P by a scalar a. This is a repeated point addition X=aP=P+P+...+P (a times). It is started with point P, and the scalar a is scanned from left to right:

starting with R=P;

scanning the scalar a from left to right:

always calculating R=2R mod(N) (so-called point doubling);

when the scanned bit of a=1, moreover R=R+P mod(N) is calculated (so-called point addition).

The algorithm for the so-called point doubling and the algorithm for the so-called point addition use operations as $X \cdot Y$ mod(N) and $X^2$ mod(N) (like the R[ivest-]S[hamir-]A[dleman] algorithm) but also by operations as R=X+Y mod (N) and R=X−Y mod(N).

The point doubling algorithm and the point addition algorithm require also an inversion operation calculating $X^{-1}$ with $X \cdot X^{-1}$ mod(N)=1.

The blinding is not suited for inversion, so the operand has first to be unblinded, then inverted and then blinded again; this is not such a problem because most algorithms work with projective coordinates having only one inversion, and this is postponed to the end. There are other known ways to blind the inversion operation.

The number of words for E[lliptic]C[urve]C[ryptography] is much smaller than the number of words for R[ivest-]S[hamir-]A[dleman]. Therefore, first the complete multiplication with addition/subtraction is performed before the reduction. Like RSA, it is also possible to interleave the multiplication and the reduction.

Here, the Montgomery reduction is used but the blinding can also be designed for other types of reduction.

In the first stage of initial blinding, this initial blinding is performed in the same way as described above for the R[ivest-]S[hamir-]A[dleman] algorithm but now both coordinates of point P have to be blinded. All operations give a result which is blinded in the same way.

In the second stage of multiplication (X·Y mod(N)) and squaring ($X^2$ mod(N)), the blinding of these operations is performed in the same way as described above for the R[ivest-]S[hamir-]A[dleman] algorithm.

In the last step of additional reduction (R=X±Y mod(N)), in case of addition, $\underline{R}=\underline{X}+\underline{Y}+V=(X-V)+(Y-V)+V=R-V$ is calculated, and in case of subtraction, $\underline{R}=\underline{X}-\underline{Y}-V=(X-V)-(Y-V)-V=R-V$ is calculated.

The implementation of the present invention may be at least partly on software basis; in this context, processors being suited for R[ivest-]S[hamir-]A[dleman] programming and/or for E[lliptic]C[urve]C[ryptography] programming can also implement the additional reduction algorithm as described above.

An exemplary hardware implementation of the protecting arrangement 100 according to the present invention is shown in FIGS. 3 and 4; for maximum speed, the multiplier unit 10 as exemplified in FIG. 3 is able to calculate the following formula:

$$B \cdot c + r = x \cdot y + B \cdot u - k \cdot B \cdot x + z + c \text{ for } k = -2, \ldots, 3;$$

r is the L[east]S[ignificant]W[ord] and c is the M[ost]S[ignificant]W[ord] of the result for example for $n_2 \cdot g + B \cdot r_5 - B \cdot k \cdot n_2 + c_2 + c$ or for $x \cdot y \pm B \cdot z + r + c$ for the multiplication of $X \cdot Y \pm Z$.

The multiplier 10

(i) calculates the product x·y;
(ii) adds z to the lower part of this product x·y, if desired;
(iii) adds the contents of the c-register 14c to the lower part of this product x·y, if desired;
(iv) adds u to the upper part of this product x·y, if desired;
(v) adds or subtracts a multiple of x to the upper part of this product x·y, if desired;
(vi) stores the lower part of the result in the r-register 14r; and
(vii) stores the upper part of the result in the c-register 14c for use in the next calculation.

As can further be taken from FIG. 3, the multiplier 10 comprises
a full adder 16r for the result r;
a full adder 16c for the carry when the multiplication is complete; and
a ranger 18 deciding in which range (with respect to $2^p$) the result is.

The building of the multiplier 10 with look-up tables is advantageous, for instance two bit because then the multiples of x (especially 3x) are already available.

Independently thereof or in connection therewith, it is also advantageous to perform the summation with carry-save adders and to use only for the r-register 14r a full-adder 16r. In this case, c then comprises two words, namely the carry and the sum of the carry-save adders. The c-registers 14c are then doubled, and also the input c comprises two words.

The ranger 18 has to decide whether the result B·c+r is smaller than $f \cdot 2^p/B^{m-1}$ where f has the following values: 0, ¾ or 1 (for $R_e$) and −⅞, −¾, −½, 0, ¾, ⅞, 1, ½, ¼ and 2. Whether the result B·c+r is positive or negative can be found by looking at the sign bit. For a value of ⅞ for instance, then the four bits from position $p-2^{m-1}$ and below are 0111. If $p=B^m$, then these four bits are the four M[ost]S[ignificant]B[it]s of c.

The multiplier 10 is connected (=reference numerals 12a, 12b in FIG. 4) to a memory 20 in which all operands are stored. Also the result is stored in this memory 20.

Furthermore, there is a state machine 30
controlling the multiplier 10 for performing the required type of calculation,
choosing the value of $k_e$ as well as the value of k,
reading the input operands from the memory 20, and
writing of the result to the memory 20.

LIST OF REFERENCE NUMERALS 100 arrangement
10 multiplier unit of arrangement 100
12a first connection between multiplier unit 10 and memory unit 20, in particular connection from multiplier unit 10 to memory unit 20
12b second connection between multiplier unit 10 and memory unit 20, in particular connection from memory unit 20 to multiplier unit 10
14c c-register module of multiplier unit 10
14r r-register module of multiplier unit 10
16c first full adder module of multiplier unit 10
16r second full adder module of multiplier unit 10
18 ranger module of multiplier unit 10
20 memory unit of arrangement 100
30 state machine of arrangement 100
Mr Montgomery reduction

The invention claimed is:

1. A system for data processing, the system being arranged to use operands to carry out a cryptographic operation on an input message (M), the system comprising:
   a memory for storing instructions,
   the system being configured to perform, by the instructions:
      blinding the input message (M) using a first random variable (V) to generate a blinded input message; and
      blinding all intermediate results (R) of the cryptographic operation using the first random variable (V) to generate corresponding blinded intermediate results;
   wherein none of the operands is inverted during the cryptographic operation;
   wherein the blinded input message is calculated as M−V mod(N) and each blinded intermediate result is calculated as R−V mod(N), and the first random variable (V) is calculated as $(B^{m-1}+B^{m-2}+\ldots+B+1)v$, wherein N is a modulus comprising m words, each of the m words comprises n bits, v is a second random variable that is one word comprising n bits, and B is equal to $2^n$.

2. The system according to claim 1, wherein the first random variable (V) is kept constant during a complete cryptographic operation, and is changed when a new cryptographic operation is started.

3. The system according to claim 1, wherein the cryptographic operation is based on at least one of Rivest-Shamir-Adleman (RSA) algorithm and Elliptic Curve Cryptography (ECC) algorithm.

4. The system according to claim 1, further comprising using a Montgomery reduction (Mr).

5. The system according to claim 1, comprising:
   at least one memory unit for storing the operands and the results of the calculations,
   at least one multiplier unit connected to the memory unit,
   at least one state machine for controlling the multiplier unit for performing the calculations, for reading the input operands from the memory unit, and/or
   for writing the results of the calculations to the memory unit.

6. The system according to claim 5, wherein the multiplier unit comprises at least one c-register module, at least one r-register module, at least one first full adder module connected to the c-register module, at least one second full adder module connected to the r-register module, and at least one ranger module for determining the range of the result.

7. A computer-implemented method of protecting at least one data processing device against at least one attack, the data processing device being arranged to use operands to carry out a cryptographic operation on an input message (M), the method comprising:
   blinding the input message (M) using a first random variable (V) to generate a blinded input message; and
   blinding all intermediate results (R) of the cryptographic operation using the first random variable (V) to generate corresponding blinded intermediate results;
   wherein none of the operands is inverted during the cryptographic operation;
   wherein the blinded input message is calculated as M−V mod(N) and each blinded intermediate result is calculated as R−V mod(N), and the first random variable (V) is calculated as $(B^{m-1}+B^{m-2}+\ldots+B+1)v$, wherein N is a modulus comprising m words, each of the m words comprises n bits, v is a second random variable that is one word comprising n bits, and B is equal to $2^n$.

8. The method according to claim 7, wherein the first random variable (V) is kept constant during a complete cryptographic operation, and is changed when a new cryptographic operation is started.

9. The method according to claim 7, wherein the cryptographic operation is based on at least one of Rivest-Shamir-Adleman (RSA) algorithm and Elliptic Curve Cryptography (FCC) algorithm.

10. The method according to claim 7, further comprising using a Montgomery reduction (Mr).

11. A non-transitory computer readable storage medium storing one or more instructions, when executed by a processor cause the processor to perfume a method of protecting at least one data processing device against at least one attack, the data processing device being arranged to use operands to carry out a cryptographic operation on an input message (M), the method comprising:
blinding the input message (M) using a first random variable (V) to generate a blinded input message; and
blinding all intermediate results (R) of the cryptographic operation using the first random variable (V) to generate corresponding blinded intermediate results;
wherein none of the operands is inverted during the cryptographic operation;
wherein the blinded input message is calculated as M−V mod(N) and each blinded intermediate result is calculated as R−V mod(N), and the first random variable (V) is calculated as $(B^{m-1}+B^{m-2}+\ldots+B+1)v$, wherein N is a modulus comprising m words, each of the m words comprises n bits, v is a second random variable that is one word comprising n bits, and B is equal to $2^n$.

12. The computer readable storage medium according to claim 11, wherein the first random variable (V) is kept constant during a complete cryptographic operation, and is changed when a new cryptographic operation is started.

13. The computer readable storage medium according to claim 11, wherein the cryptographic operation is based on at least one of Rivest-Shamir-Adleman (RSA) algorithm and Elliptic Curve Cryptography (FCC) algorithm.

14. The computer readable storage medium according to claim 11, wherein the method further comprises using a Montgomery reduction (Mr).

\* \* \* \* \*

UNITED STATES PATENT AND TRADEMARK OFFICE
CERTIFICATE OF CORRECTION

| | | |
|---|---|---|
| PATENT NO. | : 8,738,927 B2 | Page 1 of 1 |
| APPLICATION NO. | : 11/993265 | |
| DATED | : May 27, 2014 | |
| INVENTOR(S) | : Hubert | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this
Eleventh Day of August, 2015

Michelle K. Lee
*Director of the United States Patent and Trademark Office*